United States Patent [19]

Suganuma

[11] Patent Number: 4,853,535

[45] Date of Patent: Aug. 1, 1989

[54] LIGHT BEAM SCANNING DEVICE GENERATING A STABLE SYNCHRONIZING SIGNAL

[75] Inventor: Atsushi Suganuma, Minamiashigara, Japan

[73] Assignee: Fuji Photo Film Co., Ltd., Kanagawa, Japan

[21] Appl. No.: 143,876

[22] Filed: Jan. 14, 1988

[30] Foreign Application Priority Data

Jan. 14, 1987 [JP] Japan .................................. 62-7059
Apr. 17, 1987 [JP] Japan .................................. 62-94817

[51] Int. Cl.⁴ ........................ H01J 5/16; H01J 40/14
[52] U.S. Cl. .................................. 250/235; 358/494
[58] Field of Search .......... 250/234, 235, 236, 237 G, 250/237 R; 350/6.6, 6.9, 6.91, 6.1; 358/293

[56] References Cited

U.S. PATENT DOCUMENTS 4,578,577 3/1986 Noguchi et al. .................. 350/6.1
4,587,420 5/1986 Noguchi et al. .................. 358/293
4,667,099 5/1987 Arai et al. ........................ 250/235
4,760,251 7/1988 Shimada et al. .................. 250/235

Primary Examiner—David C. Nelms
Assistant Examiner—William L. Oen
Attorney, Agent, or Firm—Sughrue, Mion, Zinn, Macpeak & Seas

[57] ABSTRACT

A light beam scanning device includes a reference grid plate, a resonant light deflector for deflecting a light beam to cause the light beam to scan the reference grid plate through an fθ lens for thereby enabling the reference grid plate to produce a pulse signal, and a PLL circuit for generating a synchronizing signal from the pulse signal to read or record image information. The reference grid plate has slits defined at intervals, the slit intervals in that area of the reference grid plate which produces a pulse signal that is not directly contributed to the recording or reading of the image information being progressively smaller toward an end of the reference grid plate according to the scanning speed of the light beam.

5 Claims, 9 Drawing Sheets

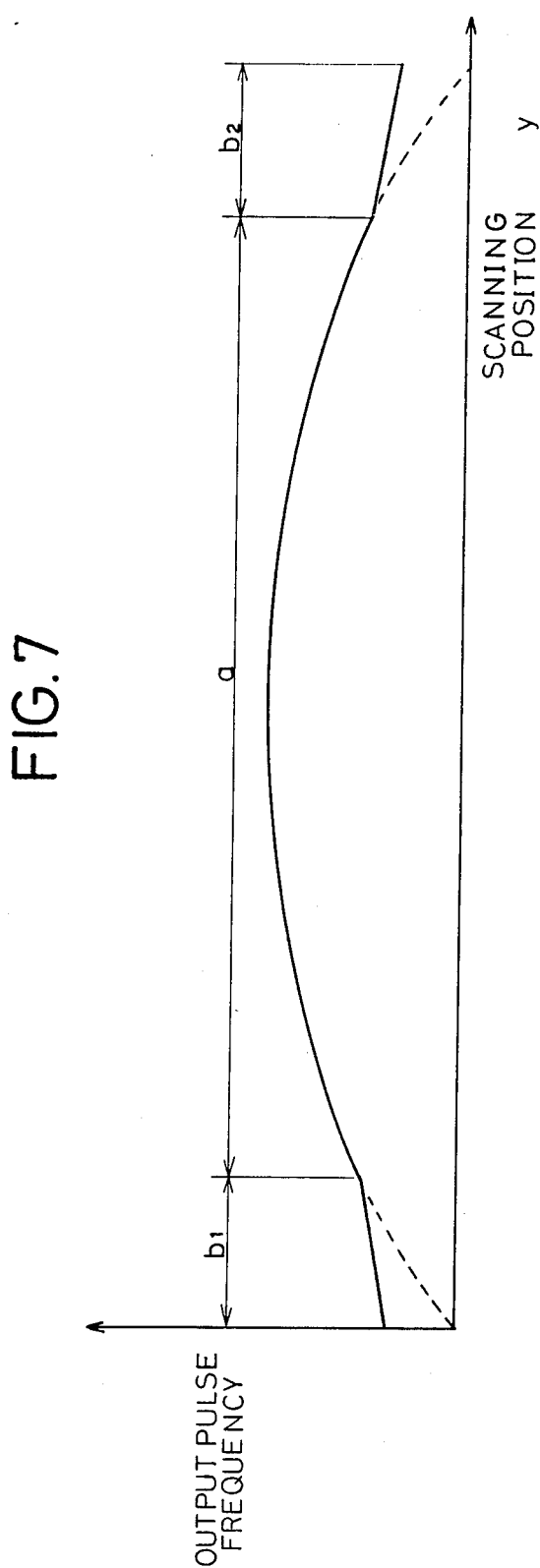

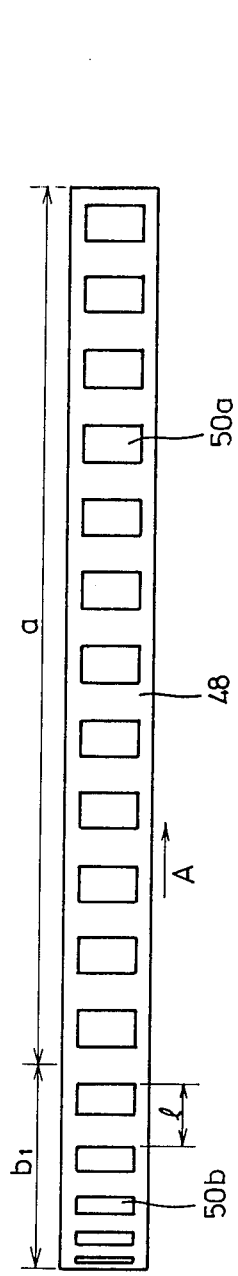

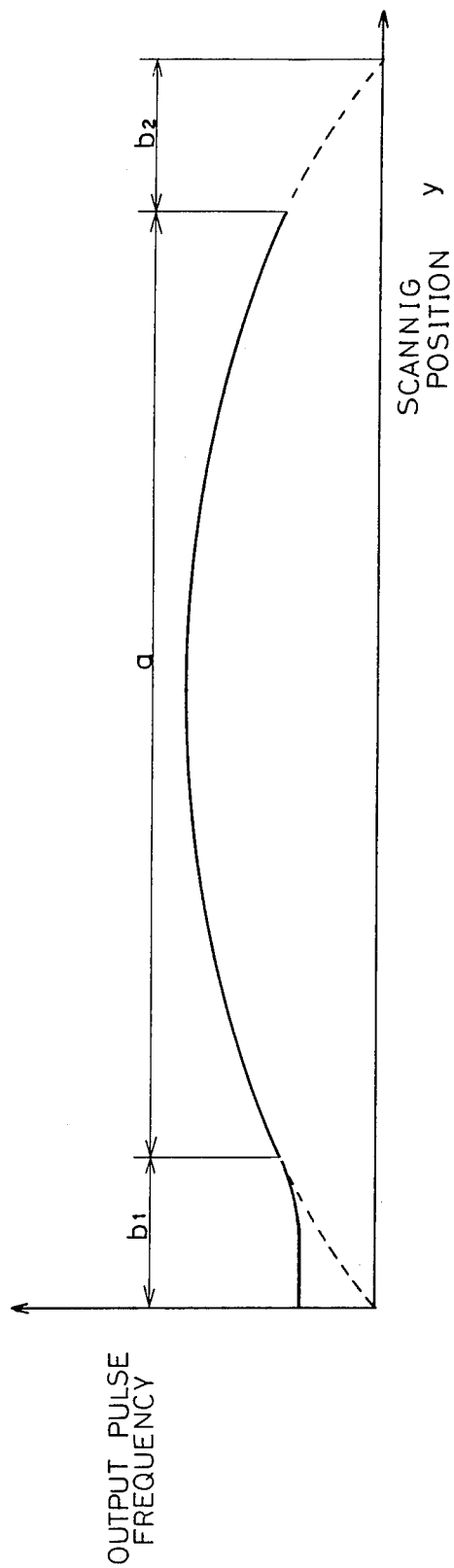

LIGHT BEAM SCANNING DEVICE GENERATING A STABLE SYNCHRONIZING SIGNAL

BACKGROUND OF THE INVENTION

The present invention relates to a light beam scanning device, and more particularly to a light beam scanning device in which a synchronizing signal is generated by a PLL circuit from a pulse signal produced by scanning a reference grid plate with a light beam, and an image is formed on the basis of the generated synchronizing signal, the reference grid plate having at its ends slits which are spaced at intervals selected according to the rate of scanning of the light beam for stablizing the synchronizing signal to enable the formation of an accurate image.

In printing and platemaking industries, image scanning recording/reproducing systems are widely used for electrically processing image information on original documents to produce film plates with a view to simplifying the operation process and increasing the image quality.

Such an image scanning recording/reproducing system is basically constructed of an image reading device and an image recording device. In the image reading device, image information on an original document which is fed in an auxiliary scanning direction is scanned by a light sensor in a main scanning direction that is substantially normal to the auxiliary scanning direction, so that the image information can be converted to an electric signal by the light sensor. Then, the image information which has been photoelectrically converted by the image reading device is subject to various processes such as for gradation correction, profile emphasis, and the like dependent on platemaking conditions in the image recording device. Thereafter, the image information thus processed is converted to a light signal represented by a laser beam, which is applied to an image recording medium made of a photosensitive material such a photographic film to record the image information thereon. The image recorded on the image recording medium is then developed by an image developing device, and the developed image recording medium is used as a film plate for printing operation.

In order to accurately reproduce the image by scanning the image recording medium with the laser beam, a synchronizing signal must be generated in synchronism with the scanning cycle of the laser beam. More specifically, in the above image recording device, a reference grid plate is scanned by a synchronizing laser beam in phase with the image recording laser beam, and a pulse signal produced by the reference grid plate is multiplied by a PLL circuit to produce a synchronizing signal. The reference grid plate has a plurality of slits defined therein at equal intervals for generating the pulse signal.

For achieving a smaller, less costly, and more reliable image recording device, it is preferable that a laser diode be employed as a synchronizing laser beam source. The synchronizing laser beam emitted from the laser diode is usually deflected by a galvanometer mirror swinging back and forth to scan the reference grid plate through an fθ lens in the main scanning direction. The fθ lens is small and lightweight, and serves to scan the rectilinear reference grid plate at a constant speed with the synchronizing laser beam which has been deflected by the galvanometer mirror.

In the image recording device, the laser beam should preferably be scanned at a higher speed for increasing the image information processing speed. One device for achieving such higher-speed laser beam scanning is a resonant light deflector for angularly moving a mirror at a high speed by utilizing the natural oscillation of an elastic member. Since the resonant light deflector swings at a speed which varies sinusoidally, the synchronizing laser beam is applied via an arc-sine lens to the reference grid plate to keep the scanning speed constant. The arc-sine lens is however disadvantageous in that it is larger in size than the fθ lens and causes the laser beam spot to be increased in diameter at the opposite ends of the reference grid plate.

The resonant light deflector may be combined with the fθ lens to accomplish higher-speed scanning while keeping the device small in size. Where the resonant light deflector is combined with the fθ lens, however, it would be impossible to control the scanning speed of the laser beam on the reference grid plate at a constant level. More specifically, the synchronizing laser beam applied to the reference grid plate is of a higher scanning speed at a central area of the reference grid plate and of a lower scanning speed at opposite ends thereof. Therefore, the frequency of a pulse signal produced from the reference grid plate is higher when the central area of the reference grid plate is scanned by the synchronizing laser beam, and lower when each end of the reference grid plate is scanned by the synchronizing laser beam. As a result, the frequency range of the pulse signal is widened. A PLL circuit for multiplying the pulse signal to produce a synchronizing signal becomes unstable and more susceptible to external noise when the frequency range of the pulse signal is wide. Consequently, no stable synchronizing signal can be produced, and an image cannot accurately be reproduced.

SUMMARY OF THE INVENTION

It is a major object of the present invention to provide a light scanning device in which a synchronizing signal is generated by a PLL circuit from a pulse signal produced by scanning a reference grid plate with a light beam, and image information or the like is recorded or read on the basis of the generated synchronizing signal, the reference grid plate having slits defined at intervals, the slit intervals in those areas of the reference grid plate which are not directly contributed to the recording or reading of the image information being made irregular according to the scanning speed of the light beam, for thereby preventing the frequency range of a pulse signal from being increased by position-dependent changes in the scanning speed, so that a stable synchronizing signal can be generated for recording or reading accurate image information.

Another object of the present invention is to provide a light beam scanning device comprising: means for generating a light beam; a reference grid plate; an fθ lens; a resonant light deflector for delecting the light beam to cause the light beam to scan the reference grid plate through the fθ lens for thereby enabling the reference grid plate to produce a pulse signal; a PLL circuit for generating a synchronizing signal from the pulse signal to read or record image information; and the reference grid plate having slits defined at intervals, the slit intervals in that area of the reference grid plate which produces a pulse signal that is not directly contributed to the recording or reading of the image information being progressively smaller toward an end of the reference grid plate according to the scanning speed of the light beam.

Still another object of the present invention is to provide a light beam scanning device, wherein the slit intervals l are selected to meet the equation:

$$\frac{l}{v} = K \cdot \frac{\Delta l}{\Delta v}$$

where v is the scanning speed of the light bedam, $\Delta l$ is the amount of variation between adjacent slit intervals l, $\Delta v$ is the amount of variation between scanning speeds v at adjacent slits, and K is a coefficient ($K \geq 1$).

A further object of the present invention is to provide a light beam scanning device, wherein the reference grid plate comprises a first grid portion having slits equally spaced along the direction in which the reference grid plate is scanned by the light beam, for generating a pulse signal directly contributed to the reading or recording of the image information, and a second grid portion connected to at least one end of the first grid portion and having slits spaced at the intervals which are progressively smaller toward the end of the reference grid plate.

A still further object of the present invention is to provide a light beam scanning device, wherein the second grid portion is disposed on at least an end of the reference grid plate where it starts being scanned by the light beam.

A yet still further object of the present invention is to provide a light beam scanning device, wherein the slit intervals of the second grid portion are selected in the vicinity of a position where the first and second grid portions are joined, such that the frequency characteristic curve of the pulse signal produced by the first grid portion and the frequency characteristic curve of the pulse signal produced by the second grid portion are smoothly blended into each other.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a graph showing the frequency characteristics of a pulse signal generated in a light beam scanning device according to a further embodiment of the present invention;

FIG. 8 is an elevational view of a reference grid plate in a light beam scanning device according to a still further embodiment of the present invention; and FIG. 9 is a graph showing the frequency characteristics of a pulse signal generated when the reference grid plate shown in FIG. 8 is employed.

DETAILED DESCRIPTION OF THE PREFERRED EMBODIMENTS

Figure 1:
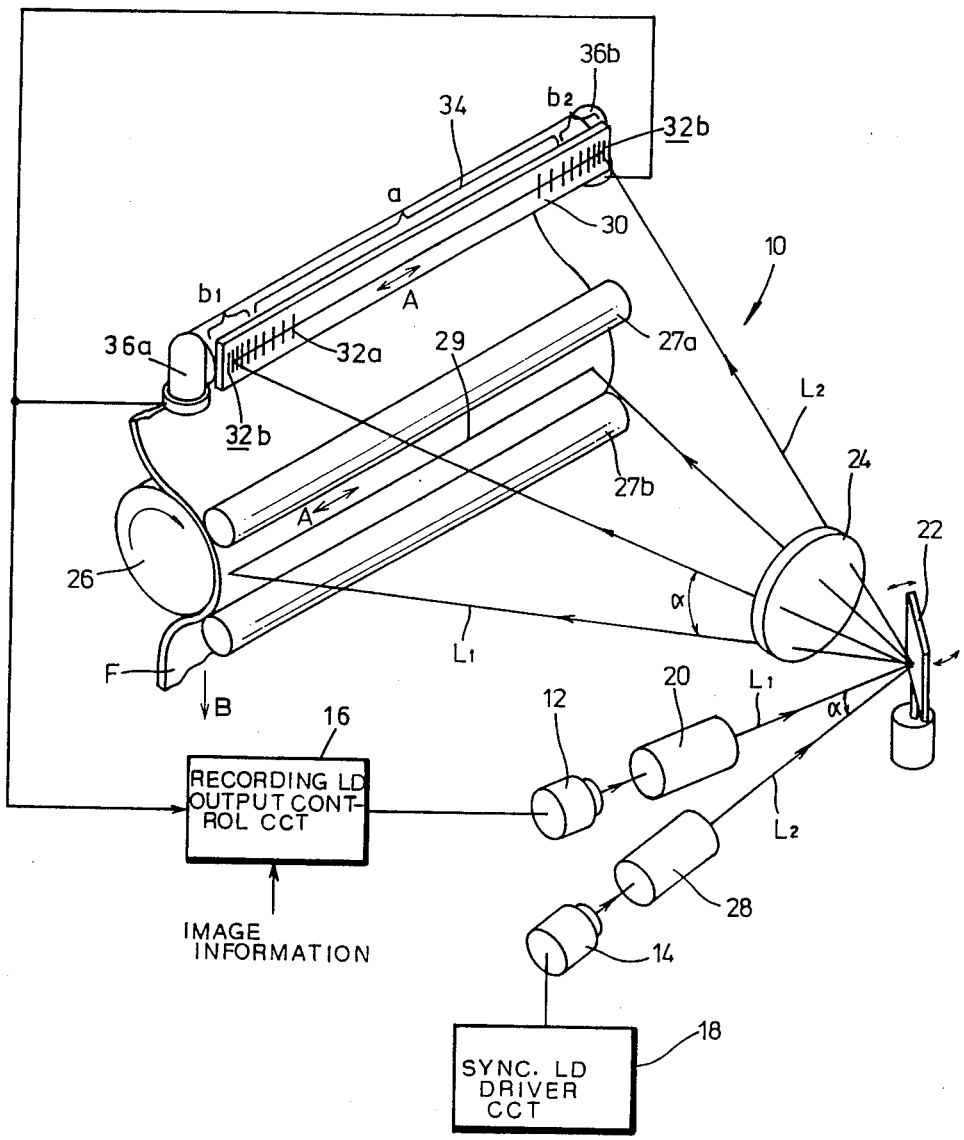
FIG. 1 is a schematic diagram, in block form, of a light beam scanning device according to the present invention.

FIG. 1 shows a light beam scanning device including a main portion 10 including a recording laser diode 12 for emitting a recording laser beam L1 and a synchronizing laser diode 14 for emitting a synchronizing laser beam L2. The main portion 10 serves to record an image on a recording medium such as a film F. The recording laser diode 12 is controlled by an output control circuit 16, whereas the synchronizing laser diode 14 is driven by a synchronizing driver circuit 18.

The recording laser beam L1 emitted from the recording laser diode 12 is converted to a parallel-ray beam by a collimator 20, and caused by a resonant light deflector 22 and an fθ lens 24 to reciprocally scan the film F in the main scanning direction of the arrow A. The film F is gripped between a drum 26 and a pair of nip rollers 27a, 27b and fed in the auxiliary scanning direction of the arrow B.

The synchronizing laser beam L2 emitted from the synchronizing laser diode 14 is converted to a parallel-ray beam by a collimator 28, and caused by the resonant light deflector 22 and the fθ lens 24 to be applied to a grid 30 which is a reference grid plate for generating a synchronizing signal, the synchronizing laser beam 12 falling on the resonant light deflector 22 at an angle α to the recording laser beam L1.

Figure 2:
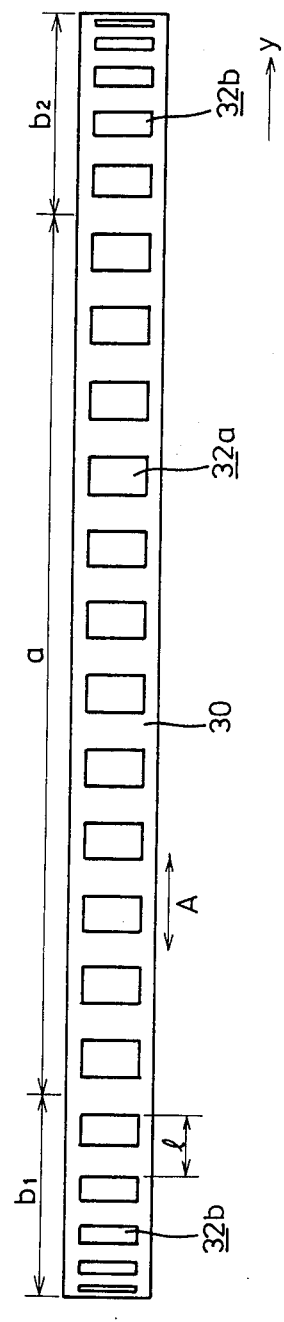
FIG. 2 is an elevational view of a reference grid plate in the light beam scanning device.

The grid 30 is longer than a main scanning line 29 that is an image recording area on the film F. The grid 30 has a range a thereon which corresponds to the main scanning line 29, and has a plurality of equally spaced slits 32a defined in the range a for passage of the synchronizing laser beam L2, as shown in FIG. 2. The grid 30 also has ranges b1, b2 extending on the opposite sides, respectively, of the central range a. The grid 30 has a plurality of slits 32b defined in each of the ranges b1, b2 and spaced at intervals or pitches l which are progressively greater toward the slits 32a in the range a. A light guide rod 34 is disposed behind the grid 30, and a pair of light detectors 36a, 36b is disposed on the opposite ends, respectively, of the light guide rod 34 for detecting the synchronizing laser beam L2 which has passed through the slits 32a, 32b defined in the grid 30. Output signals from the light detectors 36a, 36b are supplied to the output control circuit 16.

Figure 3:
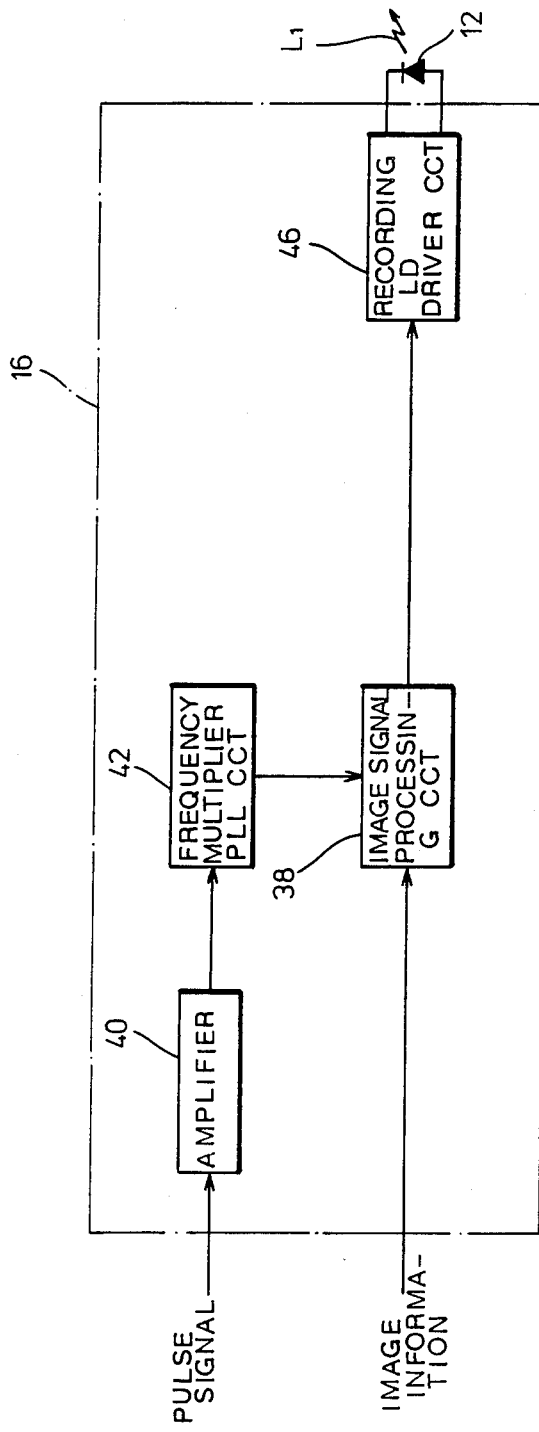
FIG. 3 is a block diagram of an output control circuit in the light beam scanning device.

The output control circuit 16 for controlling the recording laser diode 12 is arranged as shown in FIG. 3. The output control circuit 16 essentially comprises an image signal processing circuit 38 for converting image information read from an original to an image signal processed by various processes such as gradation processing, frequency processing, and the like dependent on platemaking conditions, an amplifier 40 for amplifying a pulse signal produced by the light detectors 36a, 36b, a frequency multiplier PLL circuit 42 for multiplying the pulse signal and applying the pulse signal as a synchronizing signal to the image signal processing circuit 38, and a driver circuit 46 responsive to the synchronizing signal for driving the recording laser diode 12 to emit the recording laser beam L1 based on the image signal issued from the image signal processing circuit 38.

The light beam scanning device of the above embodiment is basically of the above arrangement. Operation and advantages of the light beam scanning device will be described below.

The synchronizing laser diode 14 is energized by the driver circuit 18 to emit the synchronizing laser beam L2. The synchronizing laser beam L2 is converted by the collimator 28 to a parallel-ray beam which is applied to the resonant light deflector 22 that swings at a high speed. The synchronizing laser beam L2 is reflected by the resonant light deflector 22 and directed through the fθ lens 24 to the grid 30. The synchronizing laser beam L2 is then passed through the slits 32a, 32b defined in the grid 30 at the intervals along the main scanning direction (shown by the arrow A), and then guided by the light guide rod 34 as a pulse signal to the light detectors 36a, 36b.

Figure 4:
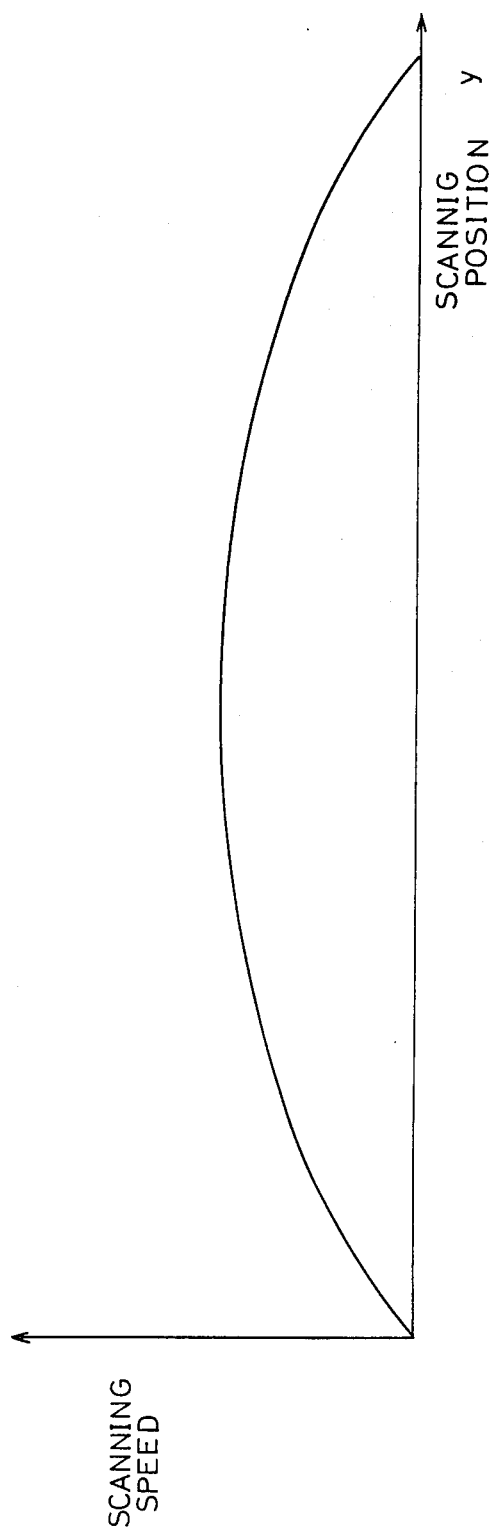
FIG. 4 is a graph showing the frequency characteristics of a pulse signal generated in the light beam scanning device.

In the illustrated embodiment, the resonant light deflector 22 and the fθ lens 24 are used in combination as a scanning optical system for high-speed image processing and making the device small in size. Since the resonant light deflector 22 is driven by a sinusoidal signal corresponding to its natural frequency, the resonant light deflector 22 can deflect the synchronizing laser beam L2 at a higher speed than that of a galvanometer mirror. The scanning speed v of the synchronizing laser beam L2 on the grid 30 varies according to the sinusoidal signal applied to drive the resonant light deflector 22. Therefore, the scanning speed v is lower at the opposite ends of the grid 30 and higher at the center of the grid 30, as illustrated in FIG. 4.

As described above, the slits 32b defined in each of the ranges b1, b2 of the grid 30 which produces the pulse signal from the synchronizing laser beam L2 are spaced at the intervals l that are progressively greater toward the range a. The pulse-to-pulse time interval T of the pulse signal which is generated by the synchronizing laser beam L2 having passed through the slits 32b and scanned at the scanning speed v is dependent on the intervals l of the slits 32b, as expressed as follows:

$$T = l/v \quad (1)$$

Assuming that the scanning speed v of the synchronizing laser beam L2 on the grid 30 varies by $\Delta v$, and the intervals l of the slits 32b vary by $\Delta l$ according to the amount $\Delta v$ of variation of the scanning speed v, the time interval t of the pulse signal which is produced by the slits 32b is given by:

$$t = \frac{l - \Delta l}{v - \Delta v} \quad (2)$$

Figure 5:
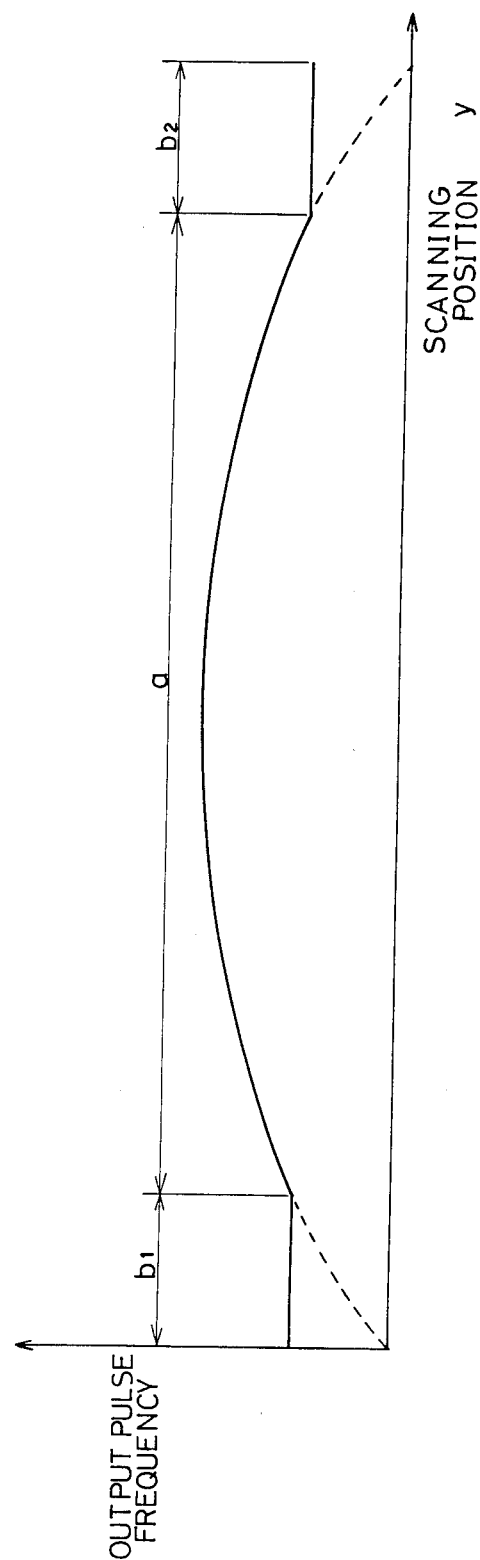
FIG. 5 is a graph showing the frequency characteristics of a pulse signal generated in a light beam scanning device according to another embodiment of the present invention.

By selecting the intervals l of the slits 32b to meet $$\frac{l}{v} = \frac{l - \Delta l}{v - \Delta v} = \frac{\Delta l}{\Delta v} \quad (3)$$

based on the above equations (1), (2), the time interval of the pulse signal which is generated in the ranges b1, b2 of the grid 30 can be made constant irrespective of the scanning speed v. The scanning speed v of the synchronizing laser beam L2 on the grid 30 at a scanning position y according to the fθ lens 24 is expressed by:

$$v = \dot{y} = \frac{d}{dt}(f\theta) = f \cdot \frac{d\theta}{dt} \quad (4)$$

where f is the focal length of the fθ lens 24 and θ is the deflection angle of the synchronizing laser beam L2 deflected by the resonant light deflector 22. Therefore, from the equations (3), (4), the intervals l of the slits 32b should be selected to be substantially in proportion to the angular velocity of the resonant light deflector 22. The intervals of the slits 32a in the range a are made constant as they correspond to the intervals of pixels of an image formed by the recording laser beam L1. FIG. 5 shows frequency characteristics of a pulse signal which is produced by thus selecting the intervals of the slits 32a, 32b.

The pulse signal produced by the grid 30 with the intervals l of the slits 32a, 32b being thus selected is then amplified by the amplifier 40 (FIG. 3) and converted to a synchronizing signal of a prescribed pitch by the frequency multiplier PLL circuit 42. At this time, the pulse signal fed to the frequency multiplier PLL circuit 42 has a narrower frequency range than a conventional pulse signal indicated by the broken lines in FIG. 5. Therefore, the frequency multiplier PLL circuit 42 is allowed to generate an accurate and stable synchronizing signal.

Where the intervals l of the slits 32b in the ranges b1, b2 are selected according to the equation (3) and the intervals l of the slits 32a in the range l are equal, the output pulse frequency abruptly varies in positions where the ranges a, b1, and b2 are joined, as shown in FIG. 5. In such positions, the frequency multiplier PLL circuit 42 tends to become unstable in operation due to an abrupt phase change.

Figure 6:
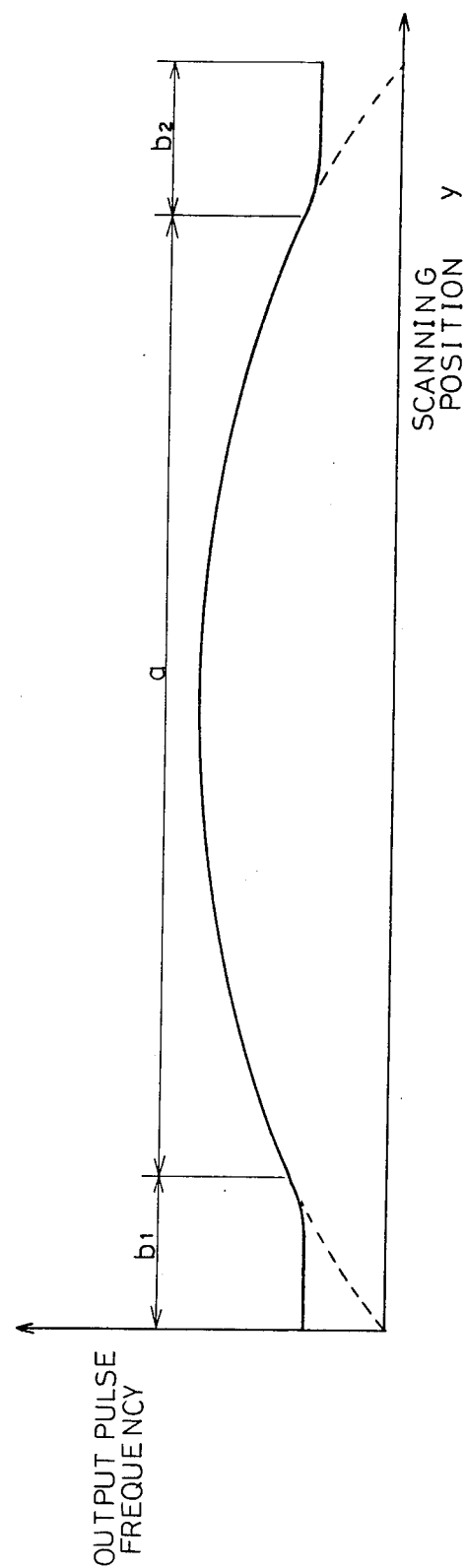
FIG. 6 is a graph showing the frequency characteristics of a pulse signal generated in a light beam scanning device according to still another embodiment of the present invention.

The frequency characteristic curve of the pulse signal may be made smoother, as shown in FIG. 6, by minimizing the amount $\Delta l$ of variation of the intervals l of the slits 32b in the vicinity of the range a. With such a frequency curve, the operation of the frequency multiplier PLL circuit 42 is stabilized for producing a more accurate synchronizing signal. Alternatively, the pulse signal may have a frequency characteristic curve as shown in FIG. 7 by selecting the intervals l to meet:

$$\frac{l}{v} = K \cdot \frac{\Delta l}{\Delta v} \quad (5)$$

($K \geq 1$), rather than minimizing the amount $\Delta l$ of variation of the intervals l of the slits 32b in the vicinity of the range a. Since the frequency change in each of the positions where the ranges a, b1, and b2 are joined is made smaller by the frequency characteristic curve of FIG. 7, the operation of the frequency multiplier PLL circuit 42 is stabilized. Any change in the frequency characteristic curve at the range junctions may be made much smoother by additionally minimizing the amount $\Delta l$ of variation of the intervals l of the slits 32b in the vicinity of the range a, as shown in FIG. 6.

The image signal processor circuit 38 converts image information read from the original to an image signal processed by various processes such as gradation processing, frequency processing, and the like dependent on platemaking conditions. The image signal is issued from the image signal processor circuit 38 based on the synchronizing signal from the frequency multiplier PLL circuit 42, and is applied to energize the driver circuit 46 to drive the laser diode 14 to emit the recording laser beam L1.

The recording laser beam L1 emitted from the laser diode 12 is converted by the collimator 20 to a parallel-ray beam which is applied to the resonant light deflector 22. The resonant light deflector 22 which swings at a high speed in the direction of the arrows by being driven by a sinusoidal driving current reflects the recording laser beam L1 through the fθ lens 24 so that the recording laser beam L1 will scan the film F back and forth along the main scanning line 29 in the direction of the arrow A. At the same time, the film M is fed in the auxiliary scanning direction of the arrow B by being sandwiched between and driven by the drum 26 and the nip rollers 27a, 27b. Therefore, an image is two-dimensionally formed on the film F by the recording laser beam L1. The image thus formed is of high quality and free of irregularities since the synchronizing signal contributed to intensity modulation of the recording laser beam L1 is accurately controlled by the frequency multiplier PLL circuit 42.

In the aforesaid embodiments, the image is formed by scanning the film M with the recording laser beam L1 deflected reciprocally in the main scanning direction of the arrow A. However, an image may alternatively be formed by scanning the film M only in one direction by employing a grid 48 as shown in FIG. 8. More specifically, the grid 48 has a plurality of slits 50a defined at equal intervals in a range a corresponding to the main scanning line 29 which is the image recording area of the film F and a plurality of slits 50b defined only in a range b1 at a scanning starting end of the grid 48, the slits 50b being spaced at intervals or pitches l which are progressively greater toward the slits 50a in the range a. The grid 48 is simpler in construction and easier to fabricate than the grid 30 shown in FIG. 3. Output pulses generated from the grid 48 have frequency characteristics as illustrated in FIG. 9. The operation of the frequency multiplier PLL circuit 42 is unstable in a range b2 outside of the grid 48. However, no problem arises since the operation of the frequency multiplier PLL circuit 42 in the range b2 shown in FIG. 9 is not responsible for the formation of an image.

With the arrangement of the present invention, as described above, a synchronizing signal is generated by a PLL circuit from a pulse signal produced by scanning a reference grid plate with a light beam, and an image is formed on the basis of the generated synchronizing signal, the reference grid plate having slits defined at intervals, the slit intervals in those areas of the reference grid plate which are not directly contributed to the recording or reading of the image information being made irregular according to the scanning speed of the light beam. Therefore, the frequency range of a pulse signal produced from the reference grid plate is effectively prevented from being increased by changes in the scanning speed. Consequently, the PLL circuit may be of an inexpensive construction and can produce an accurate and stable synchronizing signal, with the result that an image or the like can accurately be read or a high-quality image can be formed.

Although certain preferred embodiments have been shown and described, it should be understood that many changes and modifications may be made therein without departing from the scope of the appended claims.

What is claimed is:

1. A light beam scanning device comprising:
   means for generating a light beam;
   a reference grid plate;
   an fθ lens;
   a resonant light deflector for detecting said light beam to cause the light beam to scan said reference grid plate through said fθ lens for thereby enabling said reference grid plate to produce a pulse signal;
   a PLL circuit for generating a synchronizing signal from said pulse signal to read or record image information; and
   said reference grid plate having slits defined at intervals, the slit intervals in that area of said reference grid plate which produces a pulse signal that is not directly contributed to the recording or reading of the image information being progressively smaller toward an end of said reference grid plate according to the scanning speed of the light beam.

2. A light beam scanning device according to claim 1, wherein said slit intervals l are selected to meet the equation:

$$\frac{l}{v} = K \cdot \frac{\Delta l}{\Delta v}$$

where v is the scanning speed of the light beam, $\Delta l$ is the amount of variation between adjacent slit intervals l, $\Delta v$ is the amount of variation between scanning speeds v at adjacent slits, and K is a coefficient ($K \geq 1$).

3. A light beam scanning device according to claim 1 or 2, wherein said reference grid plate comprises a first grid portion having slits equally spaced along the direction in which the reference grid plate is scanned by the light beam, for generating a pulse signal directly contributed to the reading or recording of the image information, and a second grid portion connected to at least one end of said first grid portion and having slits spaced at the intervals which are progressively smaller toward the end of said reference grid plate.

4. A light beam scanning device according to claim 3, wherein said second grid portion is disposed on at least an end of the reference grid plate where it starts being scanned by the light beam.

5. A light beam scanning device according to claim 3 or 4, wherein the slit intervals of said second grid portion are selected in the vicinity of a position where said first and second grid portions are joined, such that the frequency characteristic curve of the pulse signal produced by said first grid portion and the frequency characteristic curve of the pulse signal produced by said second grid portion are smoothly blended into each other.

* * * * *